J. W. OLIVER.
CLAMPING DEVICE.
APPLICATION FILED JAN. 9, 1918.
1,283,876.
Patented Nov. 5, 1918.
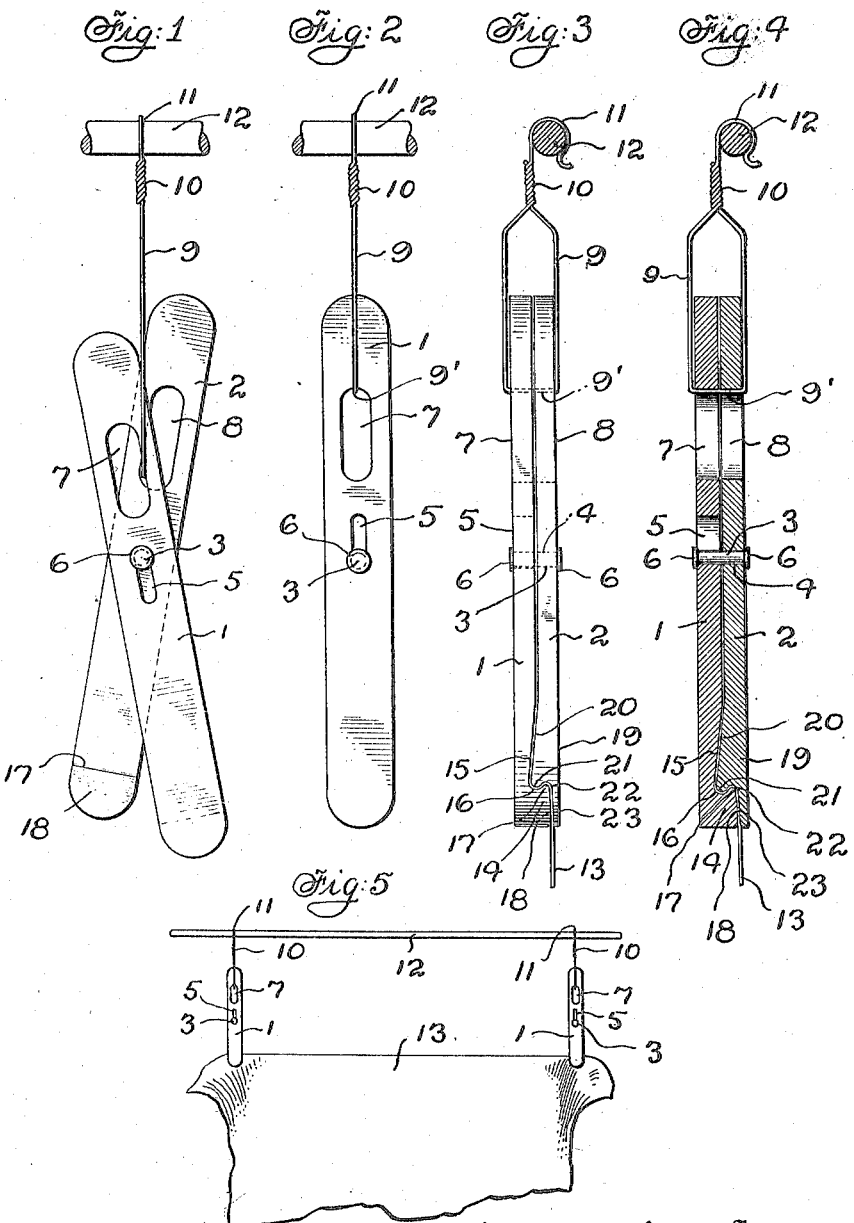
John W. Oliver, Inventor
By his Attorneys
Emery, Booth, Janney & Varney.

UNITED STATES PATENT OFFICE.

JOHN W. OLIVER, OF WEEHAWKEN, NEW JERSEY.

CLAMPING DEVICE.

1,283,876.

Specification of Letters Patent.

Patented Nov. 5, 1918.

Application filed January 9, 1918. Serial No. 211,002.

*To all whom it may concern:*

Be it known that I, JOHN W. OLIVER, a citizen of the United States, and a resident of Weehawken, in the county of Hudson and State of New Jersey, have invented an Improvement in Clamping Devices, of which the following is a specification.

The present invention relates to fastening devices, and particularly to those classes of such devices which are intended to provide means for supporting a sheet of fabric or other article between a plurality of clamping members. In such devices it is often the practice to apply the fabric or other material to be supported directly to the support, the fabric being held in place by applying the fastening device to the support and the fabric positioned thereon. This arrangement has the disadvantage that the support is often of such a character that it is not desirable to place the fabric or other article directly on the support.

It is one of the objects of my invention to provide a fastening device which avoids the disadvantage referred to and which has other desirable characteristics rendering its application ready and convenient. It is a further object of the present invention to provide a fastening device which is simple in construction and certain and convenient in operation. These and other objects will be in part apparent and in part pointed out hereinafter.

I have illustrated a preferred embodiment of my invention in the accompanying drawings, wherein;

Figure 1 is a plan view of a fastening device embodying my invention, the device being shown in open position;

Fig. 2 is a plan view of the same in closed position;

Fig. 3 is a side elevation of the device in closed position;

Fig. 4 is a cross sectional view of the same in closed position;

Fig. 5 is a plan view showing a plurality of such clamping devices as applied for supporting a sheet of fabric or similar material.

The fastening device comprises, preferably, a plurality of clamping members 1 and 2 which are pivoted to each other intermediate their ends, preferably by providing a pivot pin 3 passing through an aperture 4 in the member 2 and through a slot 5 in the member 1. In order that the pin 3 may be retained within the aperture 4 and slot 5, the ends of the same are flanged as at 6—6.

Each of the members 1 and 2 is provided in corresponding portions of the same with the guide-ways or slots 7 and 8, respectively. Operating along said guide-ways, as by passing through the slots 7 and 8, is the member 9 for a purpose subsequently to be set forth. Preferably the member 9, which comprises the operating member for the fastening device as a whole, consists of a stiff piece of spring wire passing through the slots 7 and 8 and having one end of the same fastened to the wire adjacent the other end, as by being coiled about said wire as shown at 10. The free end of the wire comprising the member 9 is in the form of a spring loop 11 whose size is so chosen that the fastening device as a whole may be detachably but fixedly positioned on the support 12 comprising, for example, a cable, wire, rod, or rope.

In order to more securely support a sheet 13 of fabric or the like on the fastening device, the member 1 is provided adjacent one end of the same with the retainer portion 14, comprising the inclined wedging surface 15, the hollow portion 16, the hook portion 17, and the auxiliary wedging surface 18. The member 2 is provided, at that end thereof which corresponds to the end of the member 1 provided with the retainer portion 14, with a coöperating retainer portion 19, comprising the wedging surface 20 coöperating with the wedging surface 15, the hook portion 21 coöperating with the hollow portion 16, the hollow portion 22 coöperating with the hook portion 17, and the auxiliary wedging surface 23 coöperating with the auxiliary wedging surface 18.

The device may be used as follows:

Due to the provision of the slot 5 in the member 1 it will be apparent that the members 1 and 2 are capable of substantially longitudinal relative movement. The purpose of this movement is to permit the retainer portions 14 and 19 to become separated so that the sheet of fabric or other article 13 may be positioned between the same. Furthermore, the provision of the pivot 3 permits the members 1 and 2 to be rotated with respect to each other. The arrangement is such that after the members 1 and 2 have been moved into open position, as illustrated in Fig. 1, in which position the retainer portions 14 and 19 will be separated to permit the insertion of the article 13, said article may be inserted between the members 1 and 2, and more particularly between the coöperating wedging surfaces 15 and 20, respectively, of the same and also between the retainer portions 14 and 19. After the article 13 has been thus inserted between the members 1 and 2 and the respective retainer portions 14 and 19 of the same, the fastening device is applied to the support 12 by springing the loop 11 over said support. As illustrated, such support may consist of a line of rope or wire, and the spring loop 11 is designed and proportioned to yieldingly attach the associated fastening device to such support. The weight of the article 13, or tension exerted on the member 9, or a combination of these two forces, causes the portion 9' of the member 9 to ride along the guide-ways or slots 7 and 8, thereby forcing the members 1 and 2 into closed position, and, by the relatively longitudinal movement of the members 1 and 2 permitted by the slot 5, simultaneously bringing the retainer portions 14 and 19 into engagement, as shown in Figs. 2 and 3. In this position the article 13 will be securely positioned and supported without contacting with the support 12.

It is of course to be understood that my invention is not limited to the particular embodiment illustrated.

What I claim is:

1. A fastening device comprising a plurality of clamping members pivoted to each other intermediate their ends and adapted to be moved into open position, each of said members being provided with a guideway in one portion thereof, said members being provided adjacent corresponding ends of the same with coöperating retainer portions and being capable of substantial longitudinal movement relatively to each other, and means operating on said members along said guideways to move said members and their associated retainer portions into closed clamping position by a combined longitudinal and pivotal movement.

2. A fastening device comprising a plurality of clamping members pivoted to each other intermediate their ends and adapted to be moved into open position, each of said members having a slot therein, said members being provided adjacent corresponding ends of the same with coöperating retainer portions and being capable of substantial longitudinal movement relatively to each other, and supporting means for said members passing through said slots and adapted to move said members and their associated retainer portions into closed clamping position by a combined longitudinal and pivotal movement.

In testimony whereof I have signed my name to this specification this 7th day of January, 1918.

JOHN W. OLIVER.

Copies of this patent may be obtained for five cents each, by addressing the "Commissioner of Patents, Washington, D. C."